United States Patent
Meyer et al.

(10) Patent No.: US 8,320,938 B2
(45) Date of Patent: Nov. 27, 2012

(54) DEVICE AND METHOD FOR LOCALIZING TERMINAL DEVICES

(75) Inventors: Steffen Meyer, Erlangen (DE); Juergen Hupp, Nuremberg (DE); Thorsten Vaupel, Hornberg (DE); Karin Loidl, Senden (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 379 days.

(21) Appl. No.: 12/530,642

(22) PCT Filed: Feb. 14, 2008

(86) PCT No.: PCT/EP2008/001133
§ 371 (c)(1),
(2), (4) Date: Dec. 1, 2009

(87) PCT Pub. No.: WO2008/113439
PCT Pub. Date: Sep. 25, 2008

(65) Prior Publication Data
US 2010/0093368 A1 Apr. 15, 2010

(30) Foreign Application Priority Data
Mar. 16, 2007 (DE) .......... 10 2007 012 782
Jun. 19, 2007 (DE) .......... 10 2007 028 114

(51) Int. Cl.
*H04W 24/00* (2009.01)

(52) U.S. Cl. .......... 455/456.1; 455/404.1; 455/414.1; 455/414.2; 455/456.2; 455/456.3; 455/456.5; 455/456.6; 455/457; 370/310.2; 370/328; 370/338

(58) Field of Classification Search .......... 455/404.1, 455/414.1, 414.2, 456.1, 456.2, 456.3, 456.5, 455/456.6, 457; 370/310.2, 328, 338
See application file for complete search history.

(56) References Cited

U.S. PATENT DOCUMENTS

| | | | |
|---|---|---|---|
| 7,471,954 B2 * | 12/2008 | Brachet et al. | 455/456.5 |
| 2004/0203885 A1 | 10/2004 | Quaid | |
| 2006/0240840 A1 | 10/2006 | Morgan et al. | |
| 2007/0184850 A1 | 8/2007 | Hupp et al. | |

FOREIGN PATENT DOCUMENTS

| | | |
|---|---|---|
| DE | 19928451 | 1/2001 |
| DE | 10142951 | 4/2003 |
| DE | 10142953 | 4/2003 |
| JP | 2004-215258 | 7/2004 |
| WO | WO 2007/101107 | 9/2007 |

* cited by examiner

*Primary Examiner* — Steve D Agosta
(74) *Attorney, Agent, or Firm* — Michael A. Glenn; Glenn Patent Group

(57) ABSTRACT

When localizing terminal devices an updating measure of reference ambient information allocated to surroundings of the terminal device is executed when a deviation of ambient information determined by means of the terminal device from reference ambient information allocated to a position of the terminal device is detected.

26 Claims, 8 Drawing Sheets

DEVICE AND METHOD FOR LOCALIZING TERMINAL DEVICES

CROSS-REFERENCE TO RELATED APPLICATIONS

This application is a U.S. national entry of PCT Patent Application Ser. No. PCT/EP2008/001133 filed 14 Feb. 2008, and claims priority to German Patent Application No. 102007012782.2 filed 16 Mar. 2007 and German Patent Application No. 102007028114.7 filed 19 Jun. 2007, which are incorporated herein by references in their entirety.

BACKGROUND OF THE INVENTION

The present invention relates to a device and a method for localizing terminal devices and in particular to how wirelessly communicating terminal devices may be localized and reliably with a high precision, wherein a continuous updating of models of changing ambient conditions is guaranteed.

In a few years the (self) localization of mobile devices or terminal devices, respectively, will be one of the most important fundamentals for modern, user friendly applications. Due to the continuously increasing distribution of handy mobile devices (e.g. PDAs, smart phones) in connection with the exhaustive availability of digital or analog transmission technologies (e.g. WLAN, UMTS, GSM), the market for applications grows supplying location relevant information to the user in every situation. Applications nowadays are mainly based on the satellite navigation systems NAVSTAR-GPS. The same may, however, in the inner city area with high buildings, tunnels and bridges, and in buildings (e.g. airports, railway stations, exhibition centers) often not provide a position, or only a very inaccurate one, as the satellite signals are attenuated or influenced too strongly. In particular these locations, however, distinguish themselves by a high number of visitors. An alternative, low cost and reliable location technology is, thus, essential which takes this scenario into account.

For the wireless network connection of portable devices, the WLAN standard, according to IEEE 802.11 (a, b, g) established itself. The same is continuously further developed, both with regard to data rate and also range. The established standards, as well as the standard 802.11n which is still in its design phase, enable a wideband data transmission with high data rates and distinguish themselves by a high integration degree, which enables a low cost hardware. In today's PDAs and smart phones wireless interfaces such as the above mentioned WLAN are usually integrated. In addition to this, often Bluetooth, and in future, possibly also WIMAX will be used.

In the case of WLAN, in the meantime, commercial, public WLAN hotspots are available in many locations with a high number of visitors. In addition to this, the strongly increasing distribution of wideband Internet connections (for example via DSL) also in the private area supported the distribution of WLAN as an advantageous home networking technology. Several studies indicated that the inner city area is, in many places today, already virtually exhaustively supplied with WLAN or even excessively covered. In particular places of daily life and of interest to tourists are well equipped in this respect.

It is currently of an advantage to use WLAN as a base technology for location. In future, of course also other technologies will be used to which the inventive concept discussed in the following may also be applied. The location in WLAN networks may, in principle, be executed by assessing the received base stations (hotspots or access points, respectively), wherein for example, the signal strength of the same received on the respective terminal device is assessed. WLAN signals are, however, strongly shielded by buildings and other obstacles, wherein in particular in areas with a broad WLAN supply usually no ideal free field conditions exist, as they are located in the city area. Thus, the distance to a base station or another communication partner may not be directly concluded from the measured signal strength or field strength, respectively. A public environment and/or surrounding or a dynamically changeable surrounding (for example a storage building) is basically subject to non-influenceable changes (setup/dismounting/exchange of access points, only temporarily limited activity of the access points, etc).

One possibility to control the complex ambient conditions which result in the non-free field applications is to determine the actual signal propagation by test measurements at geographically known reference points or reference positions, respectively. A location on the terminal device may take place by matching currently recorded measurement values to stored measurement values of the reference point data sets. From the best match or the reference points which are most suitable, respectively, a position is then estimated without any knowledge about the actual location of the base stations or the access points, respectively, being needed.

In an urban environment shaped by continuous changes of the environment, from the use of such a learnt method (also referred to as the reference point or fingerprinting method) the following problem results. The data base with reference values or the reference data, respectively, are initially detected and later have to be continuously or repeatedly updated. In other cases, the expressiveness of the reference data decreases—they "age"—and the location quality will suffer as the receive conditions or the ambient conditions, respectively (recordable ambient information), change over time.

While the fingerprinting method per se functions, the central problem is updating the reference data. To keep the effort for setup and maintenance of the database or the reference data, respectively, limited, partially methods were proposed in which all users may remove gaps and errors in the database by "catching up". A problem with this approach is the exchange and the trustworthiness of data arising in this manner. To keep the system functioning, it has to be prevented in any case that accidental erroneous measurements (e.g. when a user indicates a wrong current position when catching up) and also conscious acts of sabotage make the common database unusable. Existing approaches for WLAN location designed for the use in open surrounding (such as e.g. Place Lab or Skyhook Wireless) use triangulation instead of fingerprinting as a basic method, with the above-described disadvantages. Thus, these methods need a database in which an assignment of location information of the base station to its base station identification is executed (e.g. using the MAC address of the base station or the access point, respectively). From current measurement values, distances to several base stations are estimated and a position is calculated therefrom. In these systems, thus also the setup of a secured, reliable database is needed.

The problem of trustworthiness of learned information and a modeling of the dynamic changes of the surroundings have thus far only been insufficiently solved. Place Lab converts and imports existing databases with base station locations, e.g. of hotspot operators or from War-Driving-Community. War-Driving is the targeted driving of streets of houses with the object to find WLAN stations and supply them with a location reference. War-Drivers for this purpose use a WLAN capable laptop which is additionally equipped with a GPS receiver. The problem here is that an up-to-datedness of these data, in particular with regard to private stations, is not guaranteed. Simultaneously, precision and trustworthiness of this method are doubted.

Skyhook wireless attempts to solve the problem by the cooperation of so-called "scanners". The same are especially selected, trustworthy users which service the database by a target War-Driving. By this, keeping the database up to date is connected with a high effort and a fast adaptation with changes of access points is not possible. Skyhook Wireless currently offers its customers an annual update of the database. Nevertheless, so that the database does not age too fast, Access Point which do not belong to public hotspots of large providers (which are thus potentially continuously in operation and firmly installed in one location) are excluded from the system. Thus, however, the coverage clearly decreases as currently already a great number of the installed WLAN base stations are of private non-public nature (SOHO, Industry, etc) and as far as possible defy control and information supply.

Further location or positioning solutions, respectively, which allow all users to maintain the database rely on a sense of community of the users and thus do not consider a possible conscious tampering with the database.

The above-described, already partially used methods may only update the database in large temporal distances. Thus, this offers no reasonable way of handling or, respectively, no worthwhile concept for dealing just with temporally active stations.

This problem is especially relevant for private stations which represent a strongly growing part of the stations, as such private stations are frequently only operated on demand due to concerns with regard to the danger of a break in into the WLAN network, or due to the exposure to radiation. The solutions implemented thus far do not permit, in particular in the interesting urban area in which on the one hand the conditions for receiving for a triangulation are too difficult and on the other hand the available base stations or communication partners, respectively, frequently change, to perform a localization of terminal devices without executing the use of external positioning systems reliably.

SUMMARY

According to an embodiment, a method for localizing terminal devices may have the steps of determining ambient information by means of the terminal device; determining a position of the terminal device based on the ambient information; determining a deviation of the ambient information from reference ambient information allocated with the position of the terminal device; and undertaking an updating measure when a deviation is determined.

According to a further embodiment, a method for managing reference ambient information of surroundings of a terminal device may have the steps of receiving update information of the surroundings of the terminal device; assessing a reliability of the update information; changing the reference ambient information of the surroundings of the terminal device when a reliability criterion is fulfilled when assessing the reliability.

According to a further embodiment, a computer program may have a program code for executing the method for localizing terminal devices with the steps of determining ambient information by means of the terminal device; determining a position of the terminal device based on the ambient information; determining a deviation of the ambient information from reference ambient information allocated with the position of the terminal device; and undertaking an updating measure when a deviation is determined, when the program is executed on a computer.

According to a further embodiment, a computer program may have a program code for executing the method for managing reference ambient information of surroundings of a terminal device with the steps of receiving update information of the surroundings of the terminal device; assessing a reliability of the update information; changing the reference ambient information of the surroundings of the terminal device when a reliability criterion is fulfilled when assessing the reliability, when the program is executed on a computer.

According to a further embodiment, a localization device for localizing a terminal device may have an ambient information detector for detecting ambient information; a position determiner for determining a position of the terminal device based on the ambient information; and an observer for determining a deviation of the ambient information from reference ambient information allocated with the position of the terminal device and for undertaking an updating measure when a deviation is determined.

According to a further embodiment, a reference data manager for managing reference information in the surroundings of a terminal device may have an updater for receiving update information of the surroundings of the terminal device; an assessor for assessing a reliability of the update information; an integrator for changing the reference ambient information of the surroundings of the terminal device when it is determined by the assessor that a reliability criterion is fulfilled when assessing the reliability.

According to a further embodiment, a localization system for localizing terminal devices may have a localizer for localizing a terminal device which may have an ambient information detector for detecting ambient information; a position determiner for determining a position of the terminal device based on the ambient information; and an observer for determining a deviation of the ambient information from reference ambient information allocated with the position of the terminal device and for undertaking an updating measure when a deviation is determined; and a reference data manager for managing reference information in the surroundings of a terminal device, which may have an updater for receiving update information of the surroundings of the terminal device; an assessor for assessing a reliability of the update information; an integrator for changing the reference ambient information of the surroundings of the terminal device when it is determined by the assessor that a reliability criterion is fulfilled when assessing the reliability.

According to one embodiment, information concerning the surroundings in which the terminal device is located is determined by a terminal device. By means of reference ambient information made available for the terminal device, by the terminal device itself, its position may be determined. In addition, a deviation of the observed ambient information from the reference ambient information (which is based on a model of the surroundings of the terminal device, which is thus based on a reference data model) is determined. If a deviation of the reference ambient information from the determined ambient information is determined, an updating measure may be undertaken which, for example, includes updating the database, i.e. the reference data or the reference data model, respectively.

In an implementation of the concept for localizing terminal devices, thus a database may be dynamically updated so that the application of the concept may have the advantage, even under strongly variable ambient conditions with regard to time, to guarantee a secure localization of the terminal device.

In a further embodiment, the concept is applied to wireless terminal devices, which may for example communicate with other communication partners by means of WLAN, GSM, Bluetooth, or WIMAX. The application of the inventive concept to such devices may have the advantage that a secure and highly accurate localization is also enabled in surroundings which are subject to a fast change of the ambient conditions, i.e. the receive conditions for the underlying wireless technology.

In a further embodiment, the reference data is only updated when a criterion of trust is fulfilled, i.e. when a deviation determined by a terminal device is plausible. The requirement of additionally fulfilling the criterion of trust may cause, that the ambient conditions induced by the fast change of the ambient conditions and perceived as having changed by the terminal device are only introduced into the reference data when the determined change is actually plausible. This may cause the advantage that the reference data is updated more reliably, which may lead to an increased accuracy of the position determination by suppressing erroneous updates.

The criterion of trust may be fulfilled here in different ways. A criterion may for example be that several independent terminal devices made a similar observation. Alternatively, a repeatability of the observation may be the criterion, so that the criterion of trust is regarded as fulfilled when a terminal device made a similar observation several times. Further, a reputation system may be used, wherein the reputation of a terminal device or user, respectively, results from the observations made in the past. An assessment of the reputation may be executed by the users, wherein a feedback that the location accuracy decreased by introducing the observation of the user to be assessed, leads to a degradation of the reputation. The reference criterion may then, for example, be regarded as fulfilled when a predetermined reference value is exceeded. In addition to this, any models which may assess a reliability of the observations of a terminal device or user, respectively, are suitable to derive a criterion of trust based on the same.

According to one embodiment of the invention, the inventive concept is used in a peer-to-peer mode, in which different terminal devices communicate with each other without the necessity of a central administrative instance. This may cause the advantage that the implementation is low-cost, as a central administrative instance may be omitted. It may further be advantageous that updating the reference data in the surroundings takes place very fast, as no far distance of transmission to a possibly remotely attached centralized server has to be accepted. A further advantage of decreased data traffic may be caused by this, as when in the peer-to-peer operation only the neighboring further terminal devices are informed on the deviation, for which this information is relevant.

According to a further embodiment, the concept is operated using a central server or one or several central reference data management means which manage the reference data and, if applicable, based on updating messages transmitted by terminal devices, update the same. According to one embodiment, the reference data management means may receive several updating messages from different terminal devices, so that a reliability of the update information may be assessed before the reference data is updated. One advantage of an embodiment may thus be an increased reliability of the reference data.

According to one embodiment, the reference data may include measured or calculated ambient information for predetermined reference positions. The reference ambient information for positions not corresponding to the reference positions may be gained by means of a suitable reference data or ambient model, respectively, from the determined or, respectively, measured ambient information at the reference positions. The embodiment may thus involve the advantage that the amount of data which has to be known to a terminal device or a reference data management means, respectively, or be stored in the same for determining the position, may be substantially lower than the possible number of positions of the terminal device to be determined.

BRIEF DESCRIPTION OF THE DRAWINGS

In the following, embodiments of the invention are explained in more detail with reference to the accompanying drawings, in which.

DETAILED DESCRIPTION OF THE INVENTION

Figure 1:
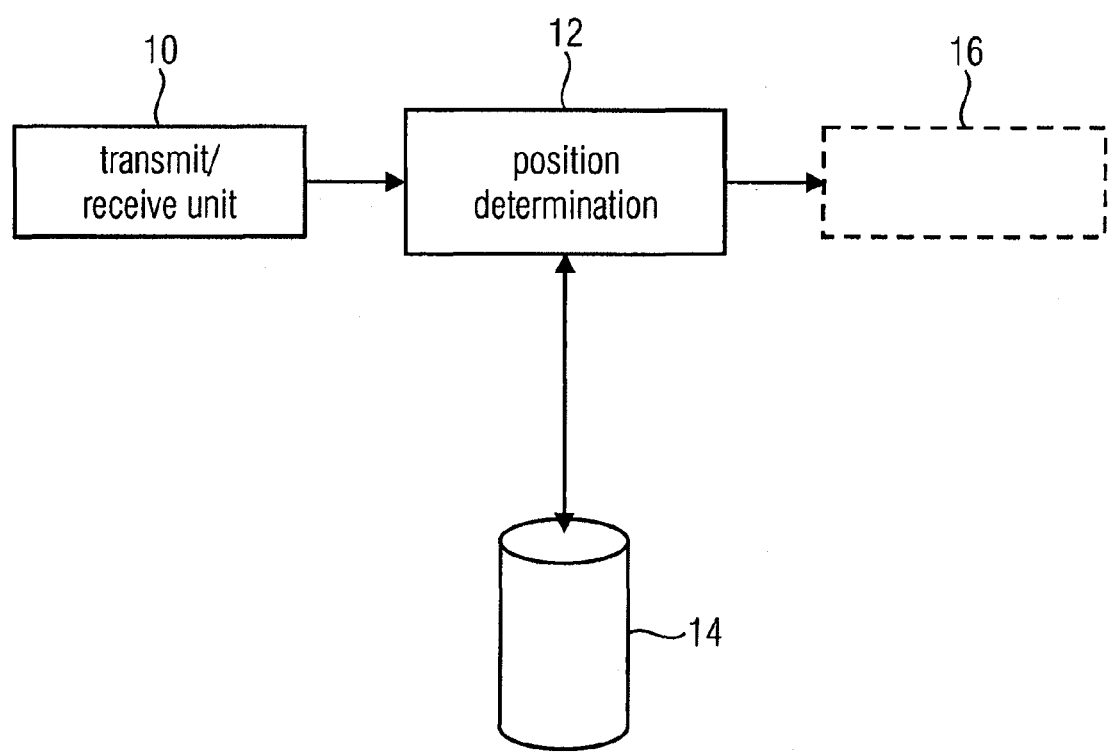
FIG. 1 shows an embodiment of a conventional device for localizing terminal devices.
Figure 2:
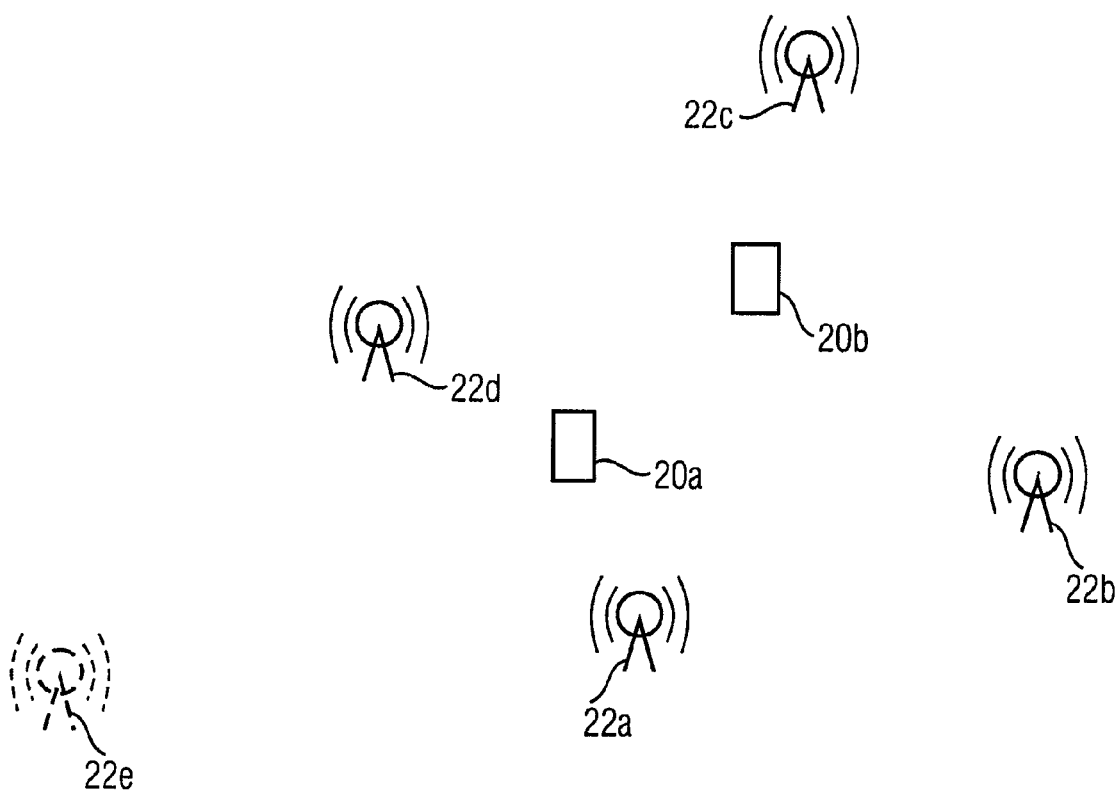
FIG. 2 shows an example of an application of the method for localizing terminal devices.

With reference to FIGS. 1 and 2, in the following, a location or position finding, respectively, according to the fingerprinting method is briefly described to motivate the inventive concept which is explained in more detail with reference to FIGS. 3 to 8.

Here, in particular, the fact is taken into account that the increasing distribution of non-public WLAN stations meanwhile leads to a clear excessive coverage in many cities. Often, in one single place, 8 to 12 stations (access points) may be received, wherein in the inner city area a number of receivable stations of 30 may even be exceeded (peak values in busy places or areas of high living or population density).

For a secure and accurate location generally already three to four stations are sufficient.

FIG. 1 illustrates how the location of a mobile terminal device may be realized by means of fingerprinting (WLAN, GSM, Bluetooth, WIMAX, etc.) in the public area as a self-localization of every individual mobile terminal device. A data transmission is not needed here, so that in principle, a connectivity of the mobile terminal device with other communication partners may be omitted. This is possible, as the mobile terminal device calculates its own position by measuring current signal characteristics (received ambient information) of its surroundings and compares the same to a local reference database (i.e. to reference ambient information).

For illustrating the method, FIG. 1 shows as an example a schematical illustration of a mobile terminal device which is capable of self-localization. Ambient information, such as for example the number of access points within reach and their respective received field strengths, is determined by a receive means 10. This ambient information is transmitted to a position determination unit 12 which further has access to reference ambient information which may be stored in a reference data management means 14.

The reference data management 14 may be stored both, locally within the mobile terminal device, and also non-locally on an external memory location or device. In the latter case, the mobile terminal device has to, of course, have access to the reference data, wherein for this purpose at least one communication connection to the reference data management means 14 has to exist. The position determination means 12 uses a location algorithm to determine the position of the terminal device based on the ambient information. Once the position has been determined, the same may optionally be transmitted to an application module 16, for example, to indicate the position in a digital city map or to offer services, respectively, which are in direct causal connection with the determined position (so-called location based services).

As an example, FIG. 2 shows an application scenario with two mobile terminal devices 20a and 20b and a plurality of communication partners or base stations 22a-22e, respectively, located in surroundings of the mobile terminal devices 20a and 20b. As ambient information, the mobile terminal devices 20a and 20b may, for example, determine the unique identification numbers of the base stations and the received field strength allocated to the respective base stations. The base station 22e is located in the greatest distance to the mobile terminal devices 20 and 20b so that the same may at certain times be received from the mobile terminal devices 20a and at other times not, which may also be caused by switching off the base station 22e. In an urban area shadowing by passersby or cars may occur. Additionally, also a change of consistence of the air, in particular humidity, may lead to the fact that some days the base station 22e is received and on other days not.

The mobile terminal devices 20a and 20b will thus generally receive temporally varying ambient information, even if they do not move themselves.

If the reference data are not updated in the application cases described in FIGS. 1 and 2, this may also lead to a strong impairment of the location accuracy of the mobile terminal devices.

Figure 3:
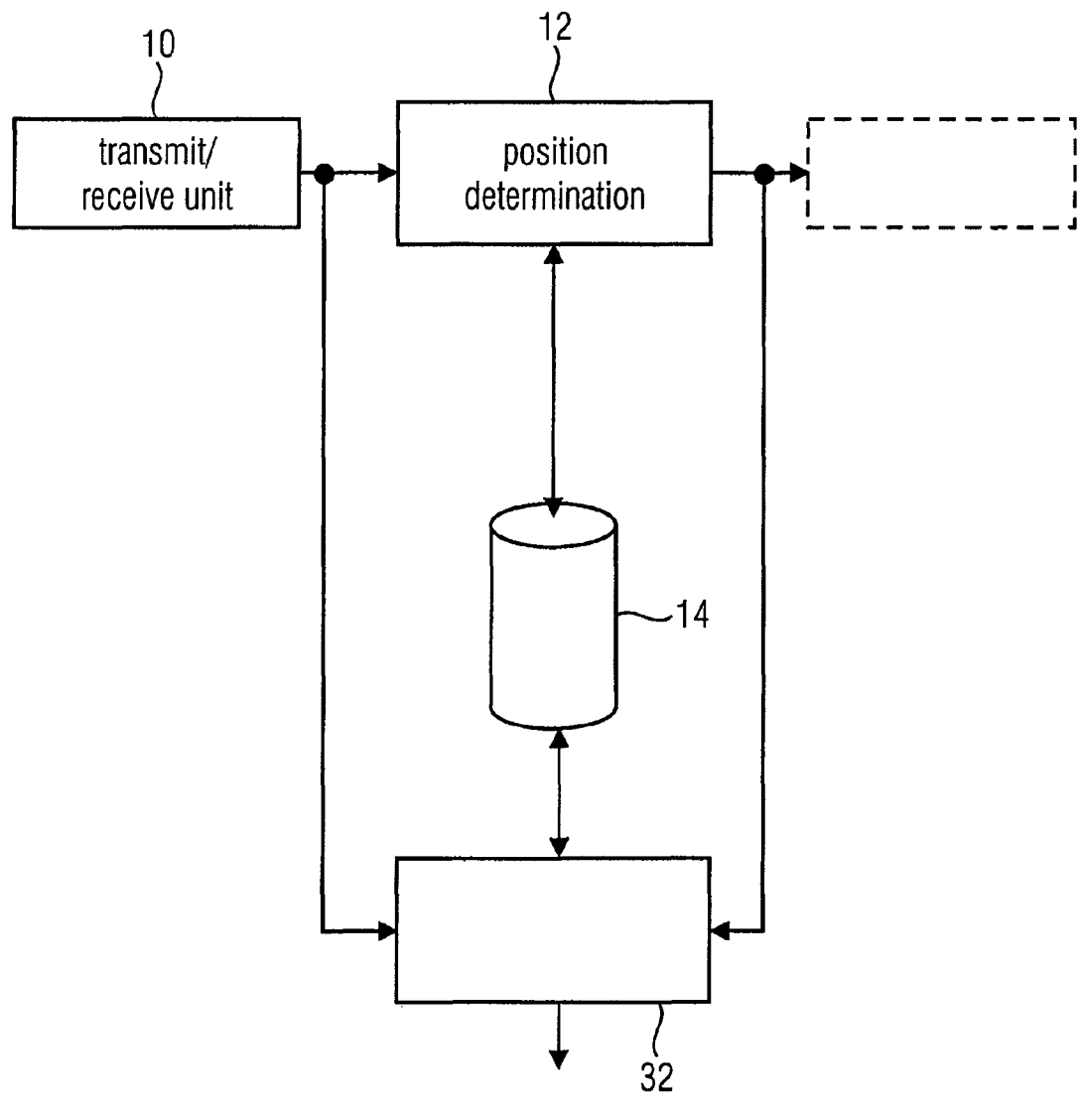
FIG. 3 shows an embodiment of an inventive device for localizing terminal devices.

The embodiment illustrated in FIG. 3 utilizes the fact that conventional fingerprinting-based location algorithms (e.g. based on WLAN, Bluetooth, WIMAX, etc) generally necessitate three to four base stations for a secure location. Thus, slight changes in the infrastructure (e.g. adding or disappearing of a station) may be tolerated with a minimal loss of accuracy. Both, the position, as well as the fact that a change was monitored is then known, so that the change of the infrastructure or the ambient information, respectively, may be linked to the determined position and be further processed. Such a proven change or a deviation of the ambient information from reference ambient information determined in this manner which shows that for this position the original reference ambient information (reference data) is old, may be used to integrate the monitored change into the reference data.

Figure 4:
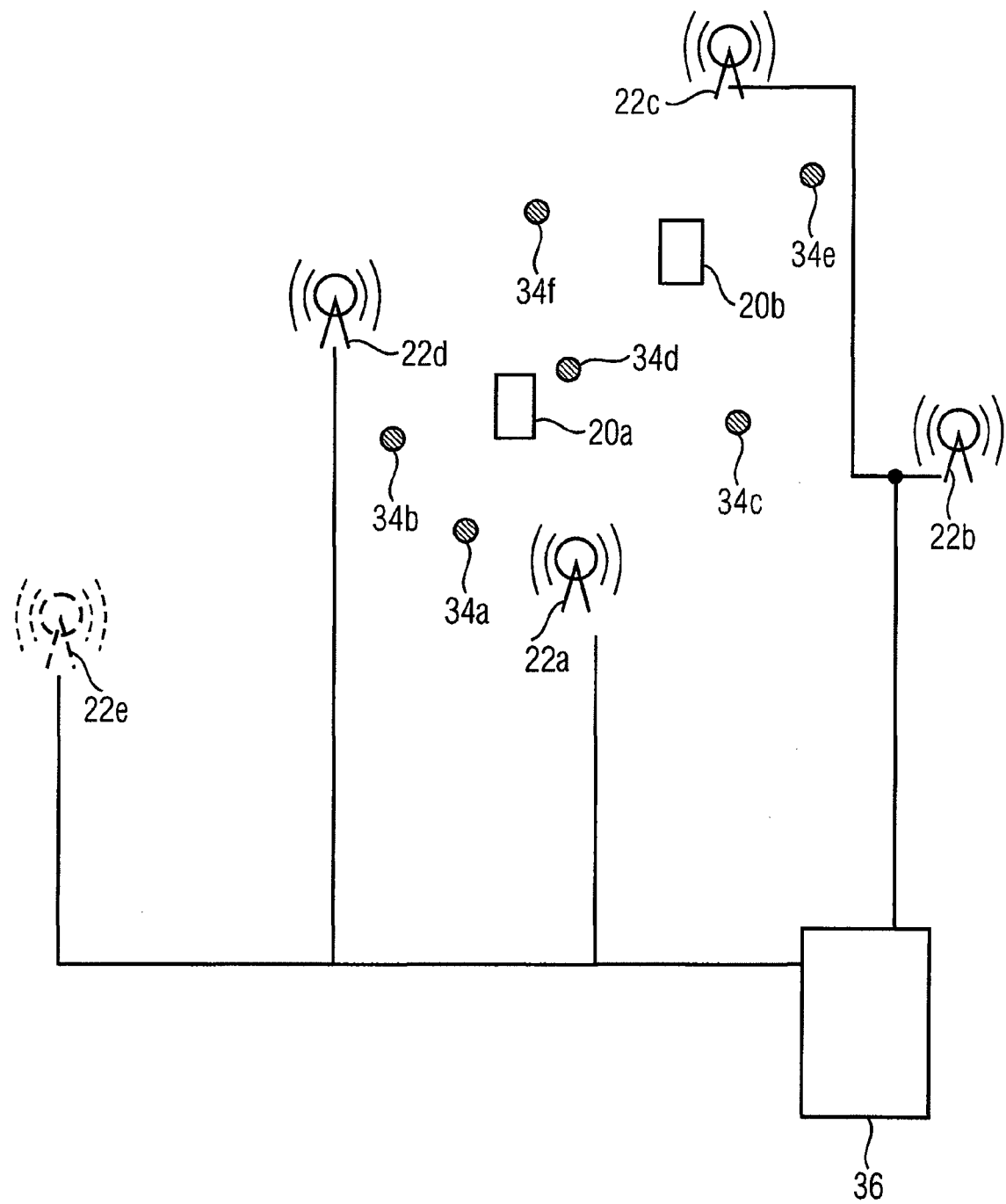
FIG. 4 shows an embodiment of an inventive system for localizing terminal devices.

This reference data may, for example, be certain ambient information in predetermined reference positions. FIGS. 3 and 4 describe an embodiment of the present invention and an illustration of the application of the present invention, respectively, in surroundings with varying ambient information (FIG. 4).

The embodiment of FIG. 3 is based on the mobile terminal device of FIG. 1 and is extended insofar that the mobile terminal device 30 additionally comprises a monitoring means which is connected to all of the position determination means 12 as well as the receive means and the reference data management means 14. The monitoring means thus has the information on the determined position, the ambient information underlying the position determination, and the reference ambient information underlying the position determination or reference data, respectively, available. For the further discussion, it is assumed that the reference data includes ambient information determined at predetermined reference position 34a-f, illustrated in FIG. 4 or are allocated to these reference positions, respectively.

The measurement values or ambient information, respectively, obtained from the receive means 10 (e.g. a WLAN transmit/receive unit) and the position calculated by the position determination means 12 by means of a location algorithm are supplied to the monitoring means 32. The monitoring means 32 may compare the reference data or reference ambient information, respectively, available for the calculated position, to the measurement value or, respectively, the determined ambient information and thus determine deviations. Such deviations may, for example, be additional or missing stations or, respectively, changes of the signal characteristic of one or several stations. The changes may be combined into one single monitoring by the monitoring means 32, or be further processed individually.

If the monitoring means 32 determines a deviation, the same may undertake an updating measure. This updating measure may, for example, be to update the reference data of this or other mobile terminal devices. When only the local data base is to be updated, the monitoring means 32 of the locally implemented reference data management means 14 may transmit update information which the reference data management means 14 may then use to update the reference database. When, as indicated in FIG. 4, ambient information for predetermined reference points 34a-34f is used as reference data, in addition to this a reference data model is needed which may determine measurement values for other positions from the discrete reference positions. In the reference data model, for this purpose the propagation conditions of the surroundings may be deposited. When, as illustrated in FIG. 4, the mobile terminal devices 20a and 20b are not located at the reference positions, the reference data model has to enable a modeling of the measurement variables (e.g. received signal strength values) contained in the reference data on the basis of the experience values at the reference positions for any intermediate positions (the positions of the mobile terminal devices 20a and 20b). This is needed, as observations are made in positions which do not necessarily correspond to reference positions.

It is obvious that the updating of the reference data may also be executed on an external reference data management means 36 illustrated as an example in FIG. 4. This may have the advantage that monitored deviations of several mobile terminal devices 20a and 20b may be used to update the reference data which may lead to an increase in accuracy of updating.

As illustrated in FIG. 4, in case of an external reference data management means 36, the update information is to be transmitted from the mobile terminal devices 20a, 20b to the reference data management means 36. This may, for example, as indicated in FIG. 4, take place by the mobile terminal devices using a transceiver (transmit/receive unit), which are in communicative contact with the reference data management means 36 via the base stations 22a-22e, so that when, as illustrated in FIG. 4, the reference data management means 36 is connected to the base stations 22a-22e, the update information is transmitted to the external reference data management means 36 using the same technology which is used for location.

Of course, also another technology for transmitting update information is possible (for example DECT, GSM, WIMAX), which may have the advantage that the network used for location is not overloaded by the update information. Thus, for example, slower transmission technologies may be used for the update information, which guarantees a sufficient data consistency, as the observed changes or, respectively, those changes considered for updating the reference data model, occur with a comparatively low data rate and frequency.

To keep the reference data, or respectively, the reference ambient information used by the mobile terminal devices, up-to-date and uncorrupted, the determined deviations of the ambient information from the reference ambient information have to be assessed regarding their relevance and their trustworthiness, before the same may be used to update the reference data. For this purpose, the monitoring means 32 may comprise an assessment means, or respectively, the reference data management means includes an assessment means, as it is described in the following.

So that a certain deviation or, respectively, an observation is regarded as relevant, at least one of the two following criteria has to be fulfilled: the observation or, respectively, the deviation has to contain a minimum measure of change as compared to the current state of the reference data. In addition to this, the observation should be reproducible. In addition, further criteria may be defined which influence the relevance of the observation. One example is the influence on the position determination when knowing about the deployed algorithmic. Examples for a minimum measure of an observed deviation or, respectively, a change are the number of seen, added or discarded base stations and the variation of the received field strength of individual stations. In principle, of course, any combination of the above criteria is possible. Further, as an essential minimum, a function of added, or respectively, discarded base stations may be defined depending on the absolute observed base station number.

One example for the criterion of reproducibility may be that the same observation, or respectively, the same deviation has to be observed several times by the respective mobile terminal device, before it is used for updating the reference data. Alternatively, it may also be advantageous that a similar observation or, respectively, a similar deviation has to be noted by several independent sources (e.g. several independent mobile terminal devices 20a and 20b).

If, for example, both the mobile terminal device 20a as well as the mobile terminal device 20b of FIG. 4 report the disappearance of base station 22e, this may be regarded as sufficiently reproducible, so that the reference data is changed in this respect.

In addition to this the possibility exists of putting the observations geographically adjacent to the reference data model in relation to each other, in order to assess the relevance in this manner. Such an exhaustive information base may further tremendously increase the degree of realism through the supplementary modeling of building and geodesy.

The assessment of trustworthiness or, respectively, the request that a criterion of trust is fulfilled, provides a protection against corruption of the reference data by incorrect observations, intentionally or non-intentionally generated. This protection may, for example, be improved by using a reputation system. The reputation of an observer (an observing unit or, respectively, a mobile terminal device 20a or 20b) here determines its trustworthiness. The reputation of an observer may for example result from the assessment of its previous observations or, respectively, its previously transmitted update information. The assessment may here be directly executed by a user (e.g. in reputation systems in online auctions, communities, hotel assessments, etc). In this case, the feedback of users, that location accuracy decreased due to the introduction of the observation of the observer to be assessed (mobile terminal device), leads to a negative assessment and consequently a worse reputation of the observer or, respectively, the respective mobile terminal device.

The assessment may also take place automatically, for example, as indicated above, by the reproducibility of an observation being used as a measure for its quality. Then, the reputation of an observer or, respectively, a mobile terminal device would be increased, when it makes observations which other observers have already made. Conversely, the reputation decreases when its observations are not shared by other observers.

The general danger of an automatic reputation system, that it may be influenced by collective erroneous messages, may be banished by a combination with an assessment by real users or reference observations of specially deployed persons (circles) or, respectively, special mobile terminal devices justified as being trustworthy.

After the assessment of the relevance and trustworthiness of the observations or, respectively, the determined deviations, the same are used for updating the reference data. The same are executed by a reference data management means which, as already mentioned, may either be implemented on the individual mobile terminal devices or as an external, central instance running, for example, on a server in the Internet.

Here, the reference data management means 36 may comprise an integration unit whose task is to use positively assessed observations or, respectively, positively assessed determined deviations, to adapt the reference data.

Figure 5:
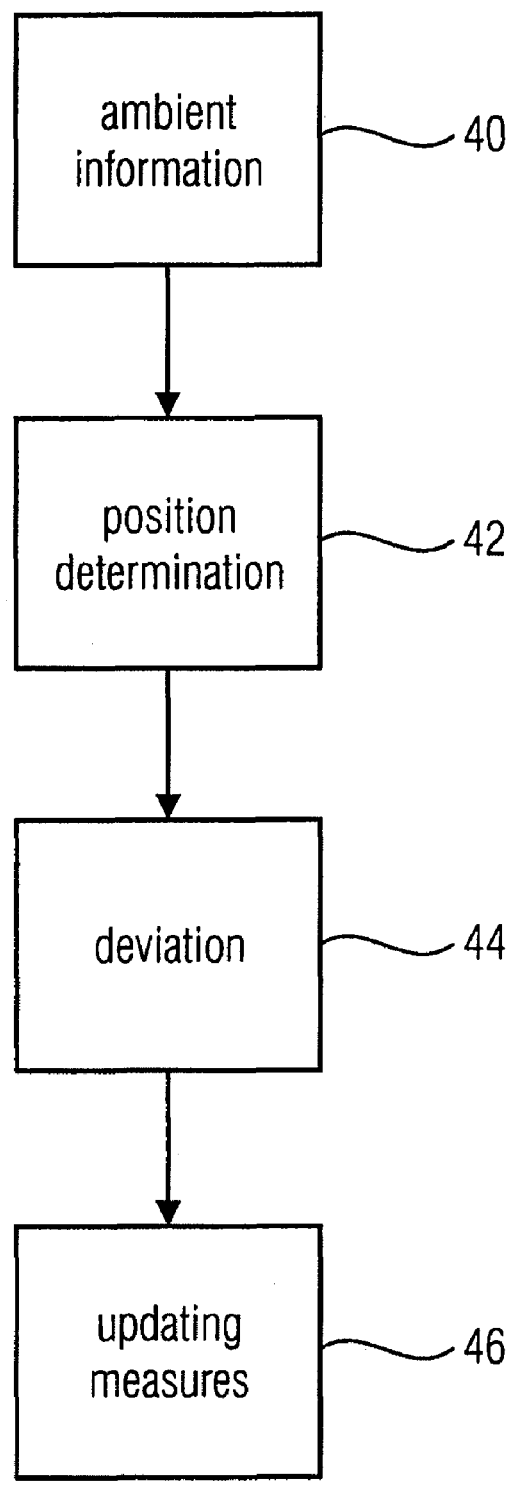
FIG. 5 shows a block diagram of an inventive method for localizing terminal devices.

FIG. 5 shows a block diagram for an inventive embodiment of a method for locating terminal devices. In a detection step 40, ambient information is first of all determined. In a position determination step 42, a position of the terminal device is determined based on the ambient information. In a test step 44, a deviation of the ambient information from the reference ambient information allocated to the position of the terminal device is determined, so that in an updating step 46, when an update is determined, an updating measure may be executed when a deviation is determined.

Figure 6:
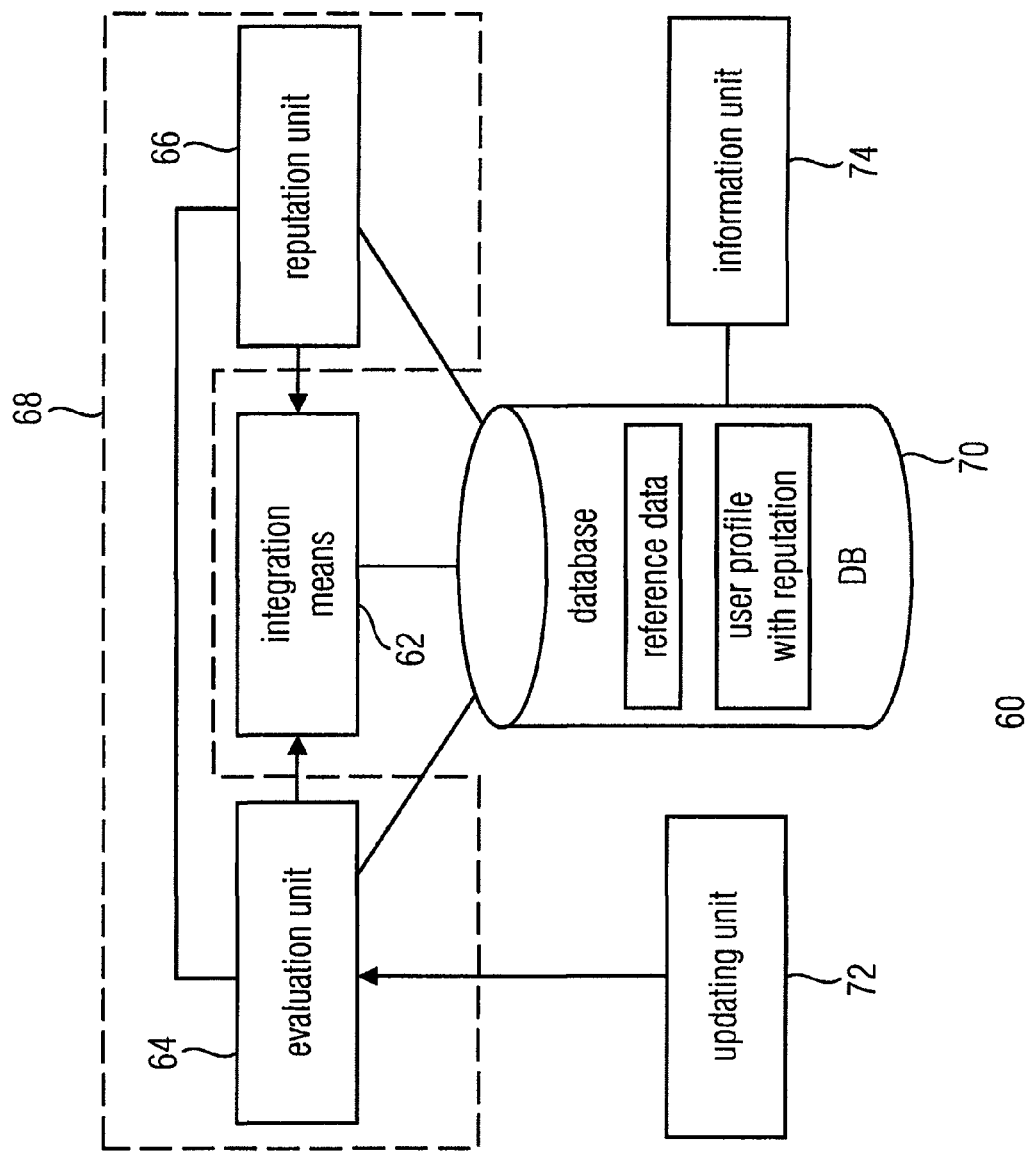
FIG. 6 shows an embodiment of an inventive reference data management means.
Figure 7:
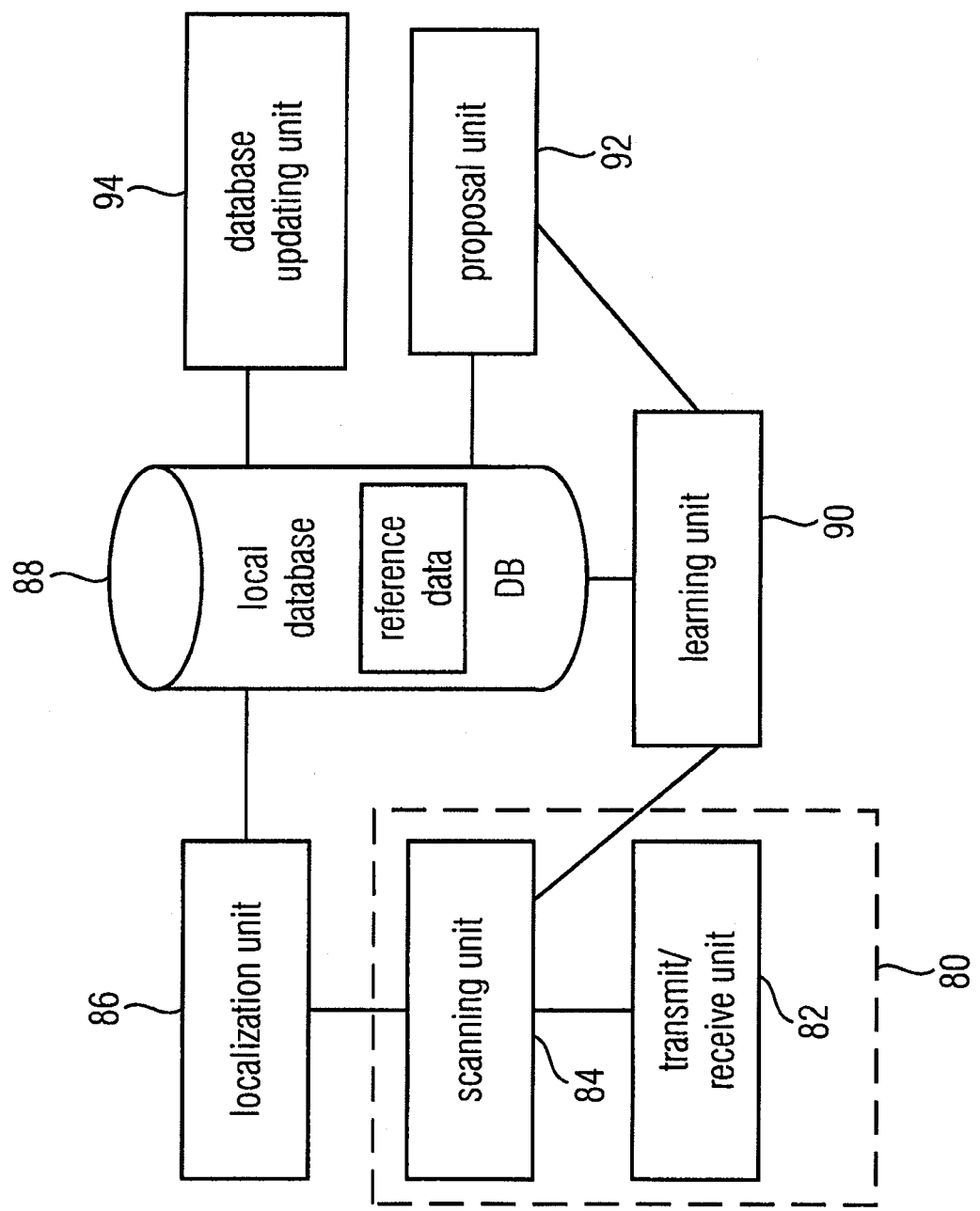
FIG. 7 shows a further embodiment of an inventive reference data management means.
Figure 8:
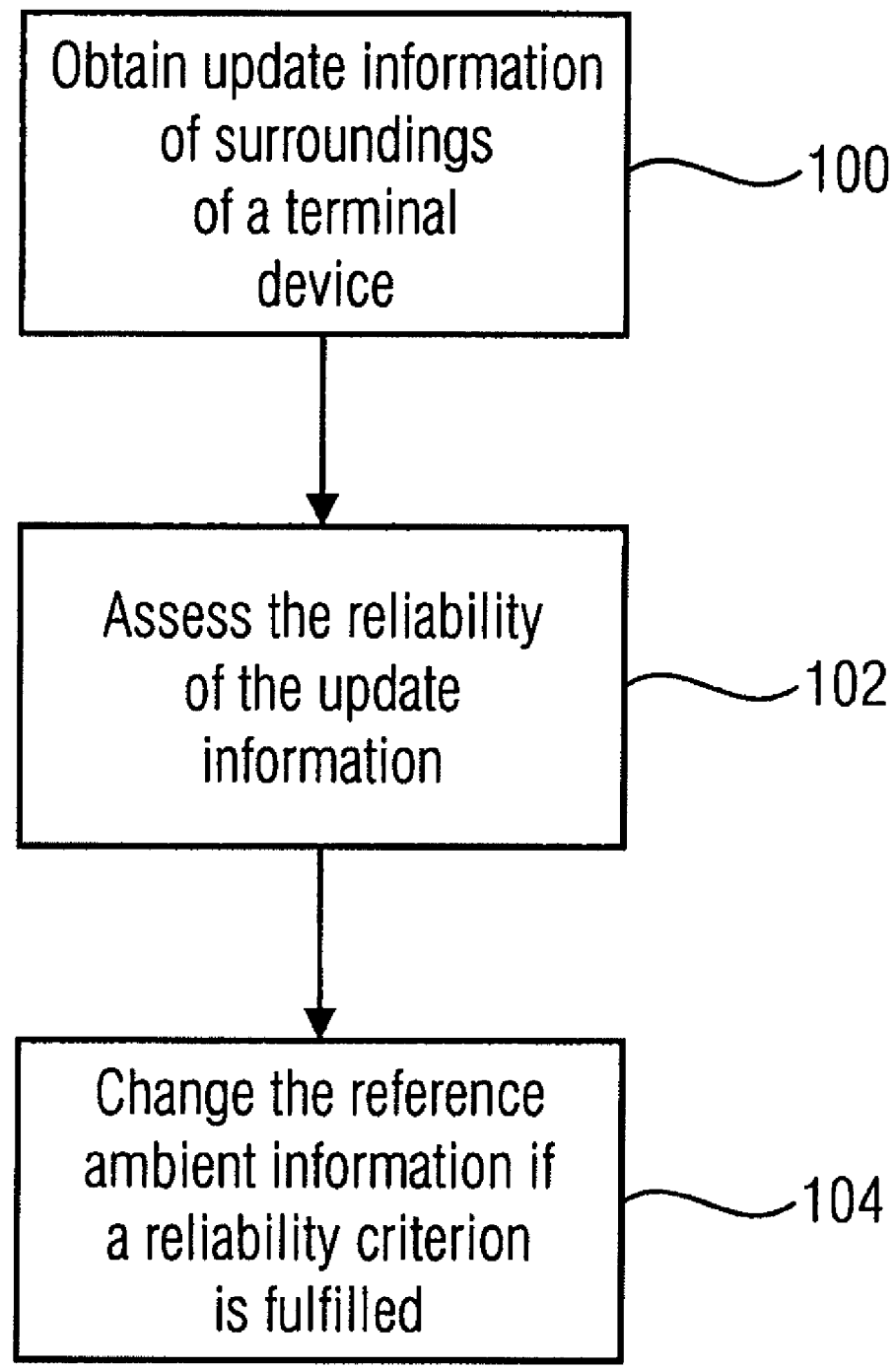
FIG. 8 shows a schematical illustration of an inventive method for managing reference ambient information of surroundings of a terminal device.

When ambient information for predetermined reference positions is used as reference data, an update of the reference data may take place, as it is for example illustrated for individual embodiments in FIGS. 6 to 8.

In general, each observation or, respectively, each determined deviation, first of all has to be converted into observations or, respectively, ambient information at the reference positions with the assistance of the reference data model. Each observation thus becomes an amount of observations for reference positions. The existing observations may be collected for each reference position and be compared to each other and to the existing reference data to increase the accuracy. From the observations and the already deposited data, updated reference data may be formed. The same may include the new reference data for a specific reference position and additional information about the observations which led to the update. Such additional information may include the complete observations or observations in an aggregated form (e.g. in the form of statistical information about the observations).

As already mentioned, the four units abstractly defined above, the observation unit, the assessment unit, the integration unit, and the reference data model may be distributed to different physical devices.

FIG. 6 shows an example of a possible distribution of these units in the form of an example for a reference data management means 60. The reference data management means 60 comprises an assessment means 68 including an integration means 62, an assessment unit 64, and a reputation unit 66, and a database comprising the reference data model 70.

The above distribution of the components, just like the embodiment illustrated in FIG. 7, is only to be regarded as an example. In principle, various possibilities of implementing the concept are possible. In the case of self-sufficient terminal devices, i.e. of a scenario in which each terminal device updates the reference data made available to the same itself, the monitoring means, the assessment means 68, the integration means 62 and the database are located on the same device, the mobile terminal device itself. The steps or, respectively, measures described are implemented locally and such a terminal device or, respectively, mobile terminal device updates its reference data only on the basis of its own observations. Due to this, a standalone operation becomes possible which does not necessitate connectivity. Such configurations are, for example, possible for mobile guidance systems such as city maps or driver guidance services.

It is further possible to implement a peer-to-peer system wherein different terminal devices may mutually profit from their independent observations. In such a system, instances of the observation means, the assessment means, the integration means, and the database are located on each participating device. In contrast to the completely self-sufficient terminal device of the above paragraph, however, the locally generated observations or, respectively, the locally observed deviations are also reported or distributed, respectively, to the other devices. The group of the further terminal devices to which a terminal device sends its observations may be limited, for example geographically (possibly only devices in a certain vicinity or in the range of reception). Thus, the amount of information to be transmitted (update information) and the load of networking may be reduced. On every terminal device the received observations of the further terminal devices are fed into the local assessment means as a supplement.

In one embodiment, the assessment means is implemented in two stages. In the first stage, local observations with regard to updated reference data are aggregated with additional information (updates). In the second stage, this data (e.g. from different devices) relating to the same reference point or the same reference position, respectively, are combined. Thus, the additional information contained in the updates may be used for assessing and weighting. Either the observations or, respectively, the determined deviations of the individual terminal devices may be directly transmitted as update information, or also the updates calculated in advance by the respective terminal device itself. In the latter case, the amount of information to be transmitted may be clearly decreased.

It is obvious that the two possibilities may also be combined, i.e. selected terminal devices may transmit either the observations or the update information, or both. This may have the advantage that the number of information to be transmitted may, for example, be made dependent on the resources of the respective terminal device (processor utilization, memory utilization, etc). In addition to this, also a dependency on the number of local observations may be introduced. Thus, if only a few observations are present, or respectively, if only a few deviations were determined, the same may be directly transmitted wherein otherwise the already rendered update information is transmitted.

As already indicated in FIG. 4, the inventive concept may also be implemented in a server-client-system. There exists thus an excellent server, or respectively, an external reference data management means 36, as it is illustrated in FIG. 4. On this server, the assessment means, the updating means, and a global database are installed.

On the terminal devices or, respectively, the mobile terminal devices, the observation means and local reference databases are located. The terminal devices transmit their observations to the server. This may be immediately at the time of observation or at a defined point in time, i.e. a synchronization point in time. Thus, the observations, or respectively, the determined deviations of all terminal devices are available on the server and are examined by means of the assessment means. Update information or, respectively, observations which are deemed to be trustworthy are serviced into the database via the integration means and, thus processed into reference data. The same are transmitted from the server back to the participating terminal devices and taken over by the same into the respective local database or, respectively, local reference database. To keep the network load low, differential information with regard to the reference data may be transmitted here. Of course, it is alternatively also possible to transmit the complete data sets when communication and integration lead allow it.

A server-client-scenario as described above may have the advantage that there is a low resource requirement on the participating terminal devices. In addition to this, the data may show a higher accuracy, as the observations of several terminal devices are introduced into the update of the reference data, i.e. the server has a global knowledge on the ambient information or, respectively, the receive situations of the participating terminal devices.

With reference to FIGS. 6 and 7, in the following an embodiment of a server-client implementation is illustrated in which a permanent connection does not need to exist.

As already described, the server illustrated in FIG. 6 comprises a database 70 containing reference data and user profiles with reputations or, respectively, reliability assessments for individual users or terminal devices, respectively. An updating unit 72 contains update information of the clients or the terminal devices, respectively.

The assessment means 68 includes the assessment unit 64 and the reputation unit 66. The assessment means 68 assesses the update proposals or, respectively, the update information with the help of the reputation of the user and matching the update information with further update information of further observers. Additionally, the assessment means may use information of the existing reference database to assess the relevance or, respectively, the trustworthiness of the update information of the respective terminal devices.

The integration means 62 serves to work in assessed update proposals or, respectively, update information into the central database 70. The reputation unit 66 assesses the user profiles for the assessment unit as part of the assessment means 68 and, based on their feedback, in turn updates the reputation or, respectively, user profiles in the database 70. An information and/or enquiry unit 74 may optionally be provided giving the clients or terminal devices reference data, e.g. for a geographical area, upon enquiry.

One example for a client or a terminal device, respectively, communicating with the server illustrated in FIG. 6, or the reference data management means illustrated in FIG. 6, respectively, is illustrated in FIG. 7. The same may comprise a receive means 80, for example, consisting of a transmit/receive unit 82 and a scanning unit 84. The example of a terminal device illustrated in FIG. 7 further comprises a position determination means 86 (location unit) and a local database 88. The receive means 80 may, in one example, only serve for receiving information or, respectively, determining ambient information. In a further embodiment, the same may also be used for transmitting data or, respectively, update information.

The scanning unit 84 serves for determining a list of the base stations in the surroundings which may be received. The scanning unit thus provides lists with an allocation between the base station identifier and the currently received field strength/signal quality. At the example of WLAN systems, the base station may be identified via its MAC address. Alternatively, the base station identifier BSSID may be used when it uniquely identifies a device. Apart from this, any other unique possibility of assignment may be implemented.

The position determination means 86 or, respectively, the location unit serves to determine the current position from the reference data and from the ambient information determined by the received means 80.

The terminal device further includes a teaching unit 90 which matches the current ambient information, i.e. the scanning data, with the reference data of the local database 88, and derives update proposals or, respectively, update information from a possibly determined deviation. One example for generating update information here may for example be the discovery of an unknown base station or the disappearance of a station indicated in the reference data. The teaching unit may here, among others, also use plausibility criteria such as walkways and -times of users (movement profiles) and explicit user inputs (e.g. the indication of a correction position). The update proposals are transferred to a proposal unit 92 which may generate a connection to the server, or receive the same, to deposit the update proposals or, respectively, the update information there. The proposal unit 92 thus serves for executing an updating measure when a deviation of the ambient information from reference information derived from the reference data is observed by the teaching unit 90.

An update means 94 is connected to the local database 88 and serves to work in updated reference data transferred by the server or, respectively, by the reference data management means into the local database.

In principle, a system based on a mobile terminal device of FIG. 7 and a reference data management means of FIG. 6 may operate according to the received signal strength fingerprinting method. This means that by test measurements the signal strength is determined by experiment at a sufficient number of points. By this, a reference database results which contains a list of base stations (access points) with the respectively allocated receive field strength and quality for each position in which a test measurement was performed. In a WLAN implementation of the inventive concept, such a reference database may for example contain the following parameters:

| RID | MAC | RSSI | PGS | X | Y | Z | MAPNR | CREATED |
|---|---|---|---|---|---|---|---|---|
| 1 | 00.0D.54.9E.17.81 | 46530 | 100 | 5795 | 15627 | 150 | 0 | 12.03.07 12:42 |
| 1 | 00.0D.54.9E.1A.BA | 67260 | 90 | 5795 | 15627 | 150 | 0 | 12.03.07 12:42 |
| 1 | 00.0D.54.9E.1D.64 | 72002 | 88 | 5795 | 15627 | 150 | 0 | 12.03.07 12:42 |
| 1 | 00.0E.6A.D3.B9.8B | 59531 | 100 | 5795 | 15627 | 150 | 0 | 12.03.07 12:42 |
| 1 | 00.0F.A3.10.07.6C | 46464 | 96 | 5795 | 15627 | 150 | 0 | 12.03.07 12:42 |
| 1 | 00.0F.A3.10.07.FB | 74488 | 94 | 5795 | 15627 | 150 | 0 | 12.03.07 12:42 |
| 1 | 00.0F.A3.10.09.SF | 72375 | 97 | 5795 | 15627 | 150 | 0 | 12.03.07 12:42 |
| 2 | 00.0D.54.9E.17.81 | 54138 | 100 | 14399 | 15451 | 150 | 0 | 12.03.07 12:43 |
| 2 | 00.0D.54.9E.18.1D | 76560 | 11 | 14399 | 15451 | 150 | 0 | 12.03.07 12:43 |
| 2 | 00.0D.54.9E.1A.BA | 62318 | 94 | 14399 | 15451 | 150 | 0 | 12.03.07 12:43 |
| 2 | 00.0D.54.9E.1D.64 | 71348 | 96 | 14399 | 15451 | 150 | 0 | 12.03.07 12:43 |
| 2 | 00.0E.6A.D3.B9.8B | 45393 | 100 | 14399 | 15451 | 150 | 0 | 12.03.07 12:43 |
| 2 | 00.0F.A3.10.07.6C | 66853 | 96 | 14399 | 15451 | 150 | 0 | 12.03.07 12:43 |
| 2 | 00.0F.A3.10.07.FB | 72251 | 100 | 14399 | 15451 | 150 | 0 | 12.03.07 12:43 |
| 2 | 00.0F.A3.10.09.5F | 70990 | 90 | 14399 | 15451 | 150 | 0 | 12.03.07 12:43 |
| 3 | 00.0D.54.9E.17.81 | 58291 | 100 | 24583 | 15627 | 150 | 0 | 12.03.07 12:43 |
| 3 | 00.0D.54.9E.18.1D | 78610 | 68 | 24583 | 15627 | 150 | 0 | 12.03.07 12:43 |
| 3 | 00.0D.54.9E.1A.BA | 62153 | 98 | 24583 | 15627 | 150 | 0 | 12.03.07 12:43 |
| 3 | 00.0D.54.9E.1D.64 | 64187 | 90 | 24583 | 15627 | 150 | 0 | 12.03.07 12:43 |
| 3 | 00.0E.6A.D3.B9.8B | 32851 | 100 | 24583 | 15627 | 150 | 0 | 12.03.07 12:43 |
| 3 | 00.0F.A3.10.07.6C | 69006 | 96 | 24583 | 15627 | 150 | 0 | 12.03.07 12:43 |
| 3 | 00.0F.A3.10.07.FB | 71749 | 92 | 24583 | 15627 | 150 | 0 | 12.03.07 12:43 |
| 3 | 00.0F.A3.10.09.5F | 71482 | 83 | 24583 | 15627 | 150 | 0 | 12.03.07 12:43 |
| 3 | 00.0F.A3.10.09.80 | 71000 | 40 | 24583 | 15627 | 150 | 0 | 12.03.07 12:43 |

The table contains the following information:
the reference point identification (RID);
the MAC addresses of the received stations;
the receive field strengths of the access points (RSSI; 46560 means −46,560 dBm);
the position in Cartesian, metrical coordinates (x, y, z; 24583 means 245,83 m) and
the point of time of measurement value recording.

The column PGS ("percentage seen") indicates how often in percent this station was seen in the measurement value recording (i.e. PGS=90 means, that on average the station was measured in 9 of 10 measurements).

For the localization, currently recorded measurement values are compared to the database. The most similar or an integration of the most similar reference points are assumed as the current position. Several methods are possible for matching; the most common one is least-distance-in-signal-space.

The least-distance-in-signal-space method was developed for a static, i.e. for non-changing surroundings. Thus, changes of the infrastructure, in particular adding and disappearing of access points lead to positioning errors. Thus, this method was improved for usage in dynamical surroundings and for the use within the scope of the inventive teachings. To be able to map dynamic surrounding with a database, further fields were integrated into the database. One example for such an extension is a database which comprises for each reference point, both the position of the point and also a list of all base stations (or, respectively, their MAC addresses) that may be received at this point.

For each individual base station, the following information is additionally deposited: the allocated receive field strength (mean, variance), the above-described PGS value, the point in time when the station was last received by a terminal device (date, time), a time profile, e.g. a weekly timetable in which it is indicated on what days of the week, and times of day, the station was seen. As already mentioned, a reputation system exists to be able to better assess change proposals or deviations from reference ambient information to ambient information observed by terminal devices and to be able to exclude harmful users from the system. Here, for each user, a user profile is set up which is deposited in the reference database on the server or, respectively, on the reference data management means. If the assessment means 68 of the server decides that the proposal of a user results in a change in the database, the reputation of this user increases. Proposals which conflict with proposals of other users, or which are not plausible, decrease the reputation of the proposing user.

The global database 88 (reference data and user profiles) is centrally managed on the server. The mobile terminal devices may receive parts of the reference database from the server or download the same, respectively, and use it as a local database 70.

The location algorithm of the position determination means 86 of the client or the terminal device, respectively, in one embodiment uses the fingerprinting method. The method for a match between the local database and the current measurement values is replaced by an error-tolerant method. The error tolerance is among others, expressed by the fact that added stations just like disappeared stations are tolerated and in addition to this, this new information is considered in the global database 70. In a further embodiment there is further the possibility to allow the user to choose between two or several possible positions or a manual precision, and to then use this information for an additional post-learning of the current position.

The position determination means 86 may not only provide reference positions of the reference data as a position, but additionally estimates a realistic course of movement between the reference points. For determining the parameters of the movement model different Fit-Algorithms may be used, for example, a Kalman-Filter. In one embodiment, the learning unit matches the current measurement values of the transmit/receive unit 82 via the scanning unit 84, the calculated position of the position determination means 86, and the local database 88 with each other on the client and/or the terminal device. By this, changes in the infrastructure as compared to the information underlying the database may be detected. From these detected changes, or the deviations determined in this way, respectively, the client generates a change proposal in the form of update information. The change proposal may thereby contain the following information:

the current position, including error estimation/reliability information;
a list of currently detected stations and their allocated field strength values and quality;
a time stamp (date and time).

In a further embodiment, the client itself then generates change proposals or, respectively, update information if no, or only minor changes can be detected. Such information of changes may be used on the server to complete or update, respectively, the weekly timetable with the temporal visibility of the stations.

A global database 70 is located on the server. In a further embodiment, the server may be available via the Internet and additionally contains an assessment means which checks new changes to be introduced with regard to relevance, plausibility, and trustworthiness before their integration.

In a further embodiment, in the assessment means the following algorithms are executed:

In the reference data assessment unit the following processes are executed:
1. Accumulation of all incoming change proposals
2. Grouping the proposals according to geographical positions (finding several proposals for one position)

For each proposal group:
3. Weighting the individual proposals with the respective reputation of the proposing user
4. Comparing the individual proposals considering time aspects (day of the week, time of day), deriving a complete proposal
5. Matching the complete proposal to the reference data in the database and passing on the complete proposal to the integration unit
6. Passing on the individual proposals to the database for updating its statistical fields.
7. Upgrade the reputation of the users whose proposal is equal the overall proposal
8. Downgrade the reputation of the users whose proposal conflicts with the overall proposal.

In a further embodiment, on the terminal device additionally a device is used which may itself detect the movements of the terminal device and introduce them into the position determination. By this, the accuracy of the overall system may be increased. One example for such a motion detection sensor is an inertia sensor.

A further embodiment includes the generation, storage, and introduction of device-specific information (device profiles) for assessing experiences and for improving positional estimations.

One embodiment for a method for managing reference ambient information of a terminal device is illustrated with regard to a block diagram in FIG. 8. Here, the main steps are a receive step 100 in which update information is received in surroundings of a terminal device. In an assessment step 102, a reliability of the update information is assessed.

In an updating step 104, the reference ambient information of the surroundings of the terminal device is changed or updated, respectively, when a reliability criterion was fulfilled when assessing the reliability.

The inventive methods for localizing terminal devices or managing reference ambient information of surroundings of a terminal device, respectively, may be used flexibly. For example, several personal digital systems (PDAs) or Smartphones equipped with WLAN transmit/receive units may be used for executing measurements. The (unique) MAC addresses of the base stations in the inner city area and the allocated receive field strengths may hereby be determined. The above-described modules or components, respectively, may be realized by means of software which may make the determined position data available for an application or a visualization surface.

In the inner city area public WLAN access points (hotspots or access points, respectively) are available punctually. The same typically have a connection to the Internet and thus to a server which implements the method for managing reference ambient information. This server contains some, or all, components described above. This connectivity is used for data transmission and for a final matching of updates.

With such a system, e.g. a guidance or information system may be realized which is available in the inner city area and enables a high position determination accuracy there.

As already mentioned, the inventive concept may also be applied to a peer-to-peer infrastructure or may be applied on self-sufficient terminal devices, even if the plurality of the detailed implementations were given in connection with a client-server based system.

The terminal devices in which the inventive method may be executed are not limited to the above mentioned PDAs and mobile telephones. Rather, any other terminal devices are possible which are equipped with transmit and receive means. This may for example be digital camera, car radios, or other components built into automobiles or motorcycles, or the like.

Depending on the circumstances, the method for localizing terminal devices may be implemented in hardware or in software. The implementation may be on a digital storage medium, in particular a floppy disc or a CD having electronically readable control signals which may cooperate with a programmable computer system so that the inventive method for localizing terminal devices is executed. In general, the invention thus also consists in a computer program product having a program code stored on a machine readable carrier for executing the inventive method when the computer program product is executed on a computer. In other words, the invention may thus also be realized as a computer program having a program code for executing the method, when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for localizing terminal devices, comprising:
    determining ambient information by means of the terminal device;
    determining a position of the terminal device based on the ambient information;
    determining a deviation of the ambient information from reference ambient information allocated with the position of the terminal device; and
    undertaking an updating measure when a deviation is determined, the method further comprising managing reference ambient information of surroundings of a terminal device, comprising:
        receiving update information of the surroundings of the terminal device;
        assessing a reliability of the update information;
        changing the reference ambient information of the surroundings of the terminal device when a reliability criterion is fulfilled when assessing the reliability,
        wherein assessing the reliability of the update information comprises assessing a value of trust of the terminal device, and
        wherein a value of trust signalizes a high trustworthiness when update information of the terminal device were correct in the past, or wherein the value of trust signalizes a high trustworthiness when an accuracy of the position determination of the terminal device is improved when considering the update information.

2. The method according to claim 1, wherein the determination of the ambient information comprises the determination of received parameters of a wireless communication device located in surroundings of the terminal device.

3. The method according to claim 2, wherein the determination of the ambient information comprises the determination of the received field strength of the wireless communication device.

4. The method according to claim 2, wherein the determination of ambient information comprises identifying the wireless communication device.

5. The method according to claim 1, wherein the determination of ambient information comprises the determination of received parameters of several wireless communication devices located in surroundings of the terminal device.

6. The method according to claim 1, wherein a decrease or an increase of a number of communication devices that may be identified using the ambient information is determined as a deviation.

7. The method according to claim 1, wherein the determination of the deviation comprises:
    determining the reference ambient information using reference data comprising ambient information for predetermined reference positions.

8. The method according to claim 7, wherein the reference ambient information is determined using the ambient information which is allocated with the reference positions in surroundings of the position of the terminal device.

9. The method according to claim 6, wherein the reference ambient information is determined by interpolation of the ambient information of the reference positions.

10. The method according to claim 1, wherein undertaking an updating measure comprises generating and/or transmitting and/or storing update information.

11. The method according to claim 10, wherein the update information comprises parts of the ambient information.

12. The method according to claim 10, wherein the update information comprises the determined deviation.

13. The method according to claim 7, wherein undertaking the updating measure comprises:
    determining changed reference data such that, using the changed reference data, determined reference ambient information corresponds to the determined ambient information within a tolerance range.

14. The method according to claim 13, wherein undertaking the updating measure comprises transmitting and/or storing the changed reference data.

15. The method according to claim 13, wherein the updating measure comprises replacing the reference data by the changed reference data.

16. The method according to claim 1, wherein the updating measure is undertaken when a criterion of trust is fulfilled.

17. The method according to claim 16, wherein the criterion of trust is fulfilled when a further deviation equivalent to the determined deviation is determined at the position of the terminal device.

18. The method according to claim 16, wherein the criterion of trust is fulfilled when a deviation of ambient information equivalent to the determined deviation is determined by a further terminal device which is in communicative contact with the terminal device.

19. A method for managing reference ambient information of surroundings of a terminal device, comprising:
    receiving update information of the surroundings of the terminal device;
    assessing a reliability of the update information;
    changing the reference ambient information of the surroundings of the terminal device when a reliability criterion is fulfilled when assessing the reliability,
    wherein assessing the reliability of the update information comprises assessing a value of trust of the terminal device,
    wherein a value of trust signalizes a high trustworthiness when update information of the terminal device were correct in the past, or wherein the value of trust signalizes a high trustworthiness when an accuracy of the position determination of the terminal device is improved when considering the update information wherein changing the reference ambient information comprises updating reference data comprising ambient information for predetermined reference positions in the surroundings of the terminal device, and wherein updating reference data comprises changing the ambient information of the reference positions using a reference data model, so that at a position of the terminal device reference ambient information determined using the changed reference data corresponds to ambient information observed by the terminal device within a tolerance range.

20. The method according to claim 19, wherein the reliability criterion is fulfilled when further update information equivalent to the acquired update information is acquired.

21. The method according to claim 19, wherein the reliability criterion is fulfilled when further update information equivalent to the acquired update information is acquired by a further terminal device.

22. The method according to claim 19, further comprising: transferring updated reference data to the terminal device.

23. A computer program product having a program code stored on a tangible machine readable carrier for executing a method for localizing terminal devices, comprising:
  determining ambient information by means of the terminal device;
  determining a position of the terminal device based on the ambient information;
  determining a deviation of the ambient information from reference ambient information allocated with the position of the terminal device; and
  undertaking an updating measure when a deviation is determined,
  wherein the program code is further for executing a method for managing reference ambient information of surroundings of a terminal device, comprising:
  receiving update information of the surroundings of the terminal device;
  assessing a reliability of the update information;
  changing the reference ambient information of the surroundings of the terminal device when a reliability criterion is fulfilled when assessing the reliability,
  wherein assessing the reliability of the update information comprises assessing a value of trust of the terminal device, and
  wherein a value of trust signalizes a high trustworthiness when update information of the terminal device were correct in the past, or wherein the value of trust signalizes a high trustworthiness when an accuracy of the position determination of the terminal device is improved when considering the update information.

24. A computer program product having a program code stored on a tangible machine readable carrier for executing a method for managing reference ambient information of surroundings of a terminal device, comprising:
  receiving update information of the surroundings of the terminal device;
  assessing a reliability of the update information;
  changing the reference ambient information of the surroundings of the terminal device when a reliability criterion is fulfilled when assessing the reliability,
  wherein assessing the reliability of the update information comprises assessing a value of trust of the terminal device,
  wherein a value of trust signalizes a high trustworthiness when update information of the terminal device were correct in the past, or wherein the value of trust signalizes a high trustworthiness when an accuracy of the position determination of the terminal device is improved when considering the update information,
  wherein changing the reference ambient information comprises updating reference data comprising ambient information for predetermined reference positions in the surroundings of the terminal device, and
  wherein updating reference data comprises changing the ambient information of the reference positions using a reference data model, so that at a position of the terminal device reference ambient information determined using the changed reference data corresponds to ambient information observed by the terminal device within a tolerance range.

25. A reference data manager for managing reference information in the surroundings of a terminal device, comprising:
  an updater for receiving update information of the surroundings of the terminal device;
  an assessor for assessing a reliability of the update information;
  an integrator for changing the reference ambient information of the surroundings of the terminal device when it is determined by the assessor that a reliability criterion is fulfilled when assessing the reliability,
  wherein assessing the reliability of the update information comprises assessing a value of trust of the terminal device, wherein a value of trust signalizes a high trustworthiness when update information of the terminal device were correct in the past, or wherein the value of trust signalizes a high trustworthiness when an accuracy of the position determination of the terminal device is improved when considering the update information,
  wherein changing the reference ambient information comprises updating reference data comprising ambient information for predetermined reference positions in the surroundings of the terminal device, and
  wherein updating reference data comprises changing the ambient information of the reference positions using a reference data model, so that at a position of the terminal device reference ambient information determined using the changed reference data corresponds to ambient information observed by the terminal device within a tolerance range.

26. A localization system for localizing terminal devices, comprising:
  a localizer for localizing a terminal device, comprising:
    an ambient information detector for detecting ambient information;
    a position determiner for determining a position of the terminal device based on the ambient information; and
    an observer for determining a deviation of the ambient information from reference ambient information allocated with the position of the terminal device and for undertaking an updating measure when a deviation is determined; and
  a reference data manager for managing reference information in the surroundings of a terminal device, comprising:
    an updater for receiving update information of the surroundings of the terminal device;
    an assessor for assessing a reliability of the update information;

an integrator for changing the reference ambient information of the surroundings of the terminal device when it is determined by the assessor that a reliability criterion is fulfilled when assessing the reliability, wherein assessing the reliability of the update information comprises assessing a value of trust of the terminal device, wherein a value of trust signalizes a high trustworthiness when update information of the terminal device were correct in the past, or wherein the value of trust signalizes a high trustworthiness when an accuracy of the position determination of the terminal device is improved when considering the update information.

\* \* \* \* \*